(12) United States Patent
Hanayama

(10) Patent No.: US 10,972,818 B2
(45) Date of Patent: Apr. 6, 2021

(54) MOUNTING TOOL AND SPEAKER DEVICE

(71) Applicant: Yamaha Corporation, Shizuoka (JP)

(72) Inventor: Katsutoki Hanayama, Shizuoka (JP)

(73) Assignee: YAMAHA CORPORATION, Shizuoka (JP)

( * ) Notice: Subject to any disclaimer, the term of this patent is extended or adjusted under 35 U.S.C. 154(b) by 15 days.

(21) Appl. No.: 16/681,483

(22) Filed: Nov. 12, 2019

(65) Prior Publication Data
US 2020/0084529 A1 Mar. 12, 2020

Related U.S. Application Data

(63) Continuation of application No. PCT/JP2017/018677, filed on May 18, 2017.

(51) Int. Cl.
*H04R 1/02* (2006.01)
*F16B 5/00* (2006.01)

(52) U.S. Cl.
CPC ............ *H04R 1/026* (2013.01); *F16B 5/0004* (2013.01)

(58) Field of Classification Search
CPC . H04R 1/02; H04R 1/026; H04R 1/18; H04R 1/403; H04R 2201/02; H04R 2201/021; F16B 5/00; F16B 5/002; F16B 5/0012; F16B 5/0016; F16B 5/0004;
(Continued)

(56) References Cited

U.S. PATENT DOCUMENTS

| 2005/0063559 A1* | 3/2005 | Lee ................... H04R 1/025 381/335 |
| 2015/0348657 A1* | 12/2015 | Bresous ................ G21C 19/19 376/260 |

(Continued)

FOREIGN PATENT DOCUMENTS

| JP | S47-001647 U1 | 8/1972 |
| JP | S59-56490 U1 | 4/1984 |

(Continued)

OTHER PUBLICATIONS

International Search Report in PCT/JP2017/018677, dated Aug. 22, 2017.

*Primary Examiner* — Thang V Tran
(74) *Attorney, Agent, or Firm* — Global IP Counselors, LLP

(57) ABSTRACT

A mounting tool includes a female member and a male member. The female member has first and second engagement grooves that are inclined such that a distance therebetween increases toward one side, and a female-side locking projection disposed adjacent to the first engagement groove and protruding to a side of the second engagement groove. The male member has first and second rail portions that are simultaneously fittable into the first and second engagement grooves, and a male-side locking projection disposed adjacent to the first rail portion. The male-side locking projection is disposed so as to interfere with the female-side engagement protrusion while the first and second rail portions that are being fitted into the first and second engagement grooves move in an intermediate axis direction, and so as not to interfere with the female-side locking projection while the second rail portion is being slid along the second engagement groove.

20 Claims, 7 Drawing Sheets

(58) Field of Classification Search
CPC .. F16B 5/0008; F16B 5/07; F16B 5/10; F16B 12/00; F16B 12/02
See application file for complete search history.

(56) References Cited

U.S. PATENT DOCUMENTS

2018/0199698 A1\* 7/2018 Fiorello ............... A44B 99/005
2019/0219083 A1\* 7/2019 Selle ..................... F16B 12/125

FOREIGN PATENT DOCUMENTS

JP        S60-146598 A    8/1985
JP        2000-166747 A    6/2000

\* cited by examiner

MOUNTING TOOL AND SPEAKER DEVICE

CROSS-REFERENCE TO RELATED APPLICATIONS

This application is a continuation application of International Application No. PCT/JP2017/018677, filed on May 18, 2017. The entire disclosure of International Application No. PCT/JP2017/018677 is hereby incorporated herein by reference.

BACKGROUND

Technological Field

The present invention relates to a mounting tool and a speaker device.

Background Information

There are cases in which a device such as a speaker is detachably mounted on a wall or a pillar. In such cases, in general, a fixing member having a supporting structure for supporting the device such as a hook is fixed to the wall, etc., and the device is supported by being hooked to this fixing member.

When mounting such a device to the wall, or the like, it is desirable to prevent the device from unintentionally falling due to the impact of another object hitting the device or to vibrations such as an earthquake. For example, Japanese Laid Open Patent Application No. H8-334107 discloses a configuration provided with a lock lever, which prevents the device from moving in a detaching direction by engaging with the device by means of elasticity.

In the configuration disclosed in Japanese Laid Open Patent Application No. H8-334107, it is necessary to swing the lock lever after mounting the device and to fix this lock lever by means of a lever fixing screw, and so the mounting work is complicated. On the other hand, when removing the device, it is necessary to swing the lock lever to release the engagement and lift the device upward, and so the device removal work is not easy.

SUMMARY

In light of the circumstances described above, an object of this disclosure is to provide a mounting tool with which it is possible to easily mount a device to a wall, or the like, so that the device does not unintentionally fall due to vibration, or the like, and a speaker device that can be easily mounted to a wall, or the like, so as not to fall unintentionally due to vibration, or the like.

A mounting tool according to one aspect of this disclosure comprises a female member and a male member. The female member has a first engagement groove and a second engagement groove that are inclined such that a distance between the first engagement groove and the second engagement groove increases toward one side of the female member. The first engagement groove and the second engagement groove open inward as viewed in a cross-sectional view of the female member. The female member further has a female-side locking projection that is disposed adjacent to the first engagement groove and protrudes toward a side of the second engagement groove from the first engagement groove. The male member has a first rail portion and a second rail portion that are simultaneously finable into the first engagement groove and the second engagement groove. The male member further has a male-side locking projection that is disposed adjacent to the first rail portion and so as to interfere with the female-side engagement protrusion while the first rail portion and the second rail portion that are being fitted into the first engagement groove and the second engagement groove move in an intermediate axis direction between the first engagement groove and the second engagement groove, and so as not to interfere with the female-side locking projection while the second rail portion is being slid along the second engagement groove.

In the mounting tool, the male member and the female member are each formed by bending one sheet of metal plate.

In the mounting tool, an inclination angle of each of the first engagement groove and the second engagement groove with respect to the intermediate axis direction is 5° to 20°.

In the mounting tool, each of the first engagement groove and the second engagement groove includes an inner portion that has a curved cross-sectional shape.

In the mounting tool, a distal end edge of the female-side locking projection has an end portion corner which is disposed on the one side of the female member and is chamfered In the mounting tool, a distal end edge of the female-side locking projection is inclined such that a distance from an intermediate axis to the distal end edge increases as the distance between the first engagement groove and the second engagement move increases, and the intermediate axis extends in the intermediate axis direction.

In the mounting tool, a distance from the distal end of the male-side locking projection to the second rail portion is smaller than a distance from a distal end of the female-side locking projection to an innermost portion of the second engagement groove, and a distance from the distal end of the male-side locking projection to an intermediate axis that extends in the intermediate axis direction between the first rail portion and the second rail portion is larger than a distance from the distal end of the female-side locking projection to the intermediate axis.

A mounting tool according to another aspect of this disclosure comprises a female member and a male member. The female member has a first engagement groove and a second engagement groove that are inclined such that a distance between the first engagement groove and the second engagement groove increases toward one side of the female member. The female member further has a female-side locking projection that is disposed adjacent to the first engagement groove and protrudes toward a side of the second engagement groove from the first engagement groove. The male member has a first rail portion and a second rail portion that are disposed so as to have a distance between the first rail portion and the second rail portion and inclination that are complementary to the distance between the first engagement groove and the second engagement groove and inclination of the first engagement groove and the second engagement groove. The male member further has a male-side locking projection that is disposed adjacent to the first rail portion. The male-side locking projection partially overlaps with the female-side locking projection as viewed in an intermediate axis direction between the first engagement groove and the second engagement groove, in a state in which the first rail portion and the second rail portion are fitted into the first engagement groove and the second engagement groove, while the male-side locking projection does not overlap with the female-side locking projection as viewed in a direction along the second engagement groove in the state in which the first rail portion and the second rail portion are fitted into the first engagement groove and the second engagement groove.

A speaker device according to another aspect of this disclosure comprises the mounting tool according to the one aspect or the another aspect described above, and a speaker having a back surface to which one of the female member and the male member of the mounting tool is attached.

The speaker device further includes an additional mounting tool which includes an additional female member and an additional male member that are identical to the female member and the male member, respectively, and one of the additional female member and the additional male member is fixed to the back surface of the speaker such that the mounting tool and the additional mounting tool are aligned in an aligning direction with a space therebetween.

The speaker device further includes an additional mounting tool which includes an additional female member having an arrangement reversed to an arrangement of the female member with respect to an intermediate axis extending in the intermediate axis direction, and an additional male member having an arrangement reversed to an arrangement of the male member with respect to the intermediate axis, and one of the additional female member and the additional male member is fixed to the back surface of the speaker such that the mounting tool and the additional mounting tool are aligned in an aligning direction with a space therebetween.

BRIEF DESCRIPTION OF THE DRAWINGS

Referring now to the attached drawings which form a part of this original disclosure.

DETAILED DESCRIPTION OF THE EMBODIMENTS

Selected embodiments will now be explained in detail below, with reference to the drawings as appropriate. It will be apparent to those skilled from this disclosure that the following descriptions of the embodiments are provided for illustration only and not for the purpose of limiting the invention as defined by the appended claims and their equivalents.

Speaker Device

Figure 1:
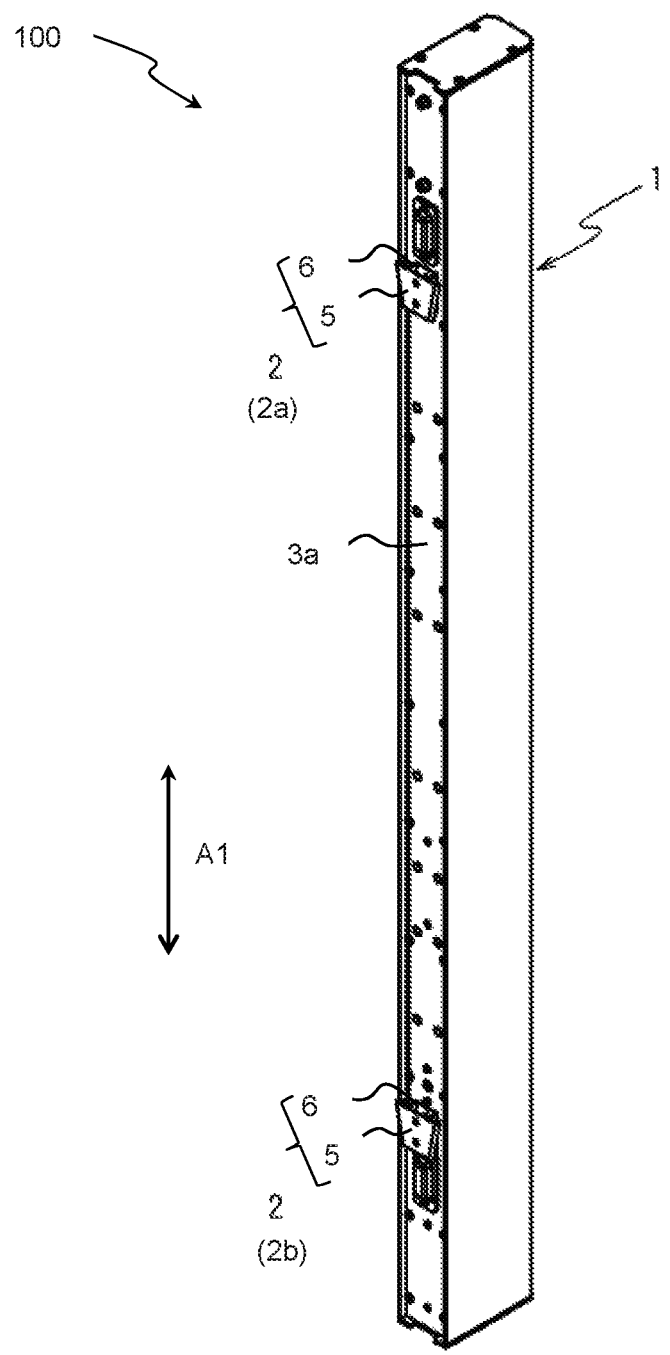
FIG. 1 is a perspective view illustrating a back side of a speaker device according to one embodiment.
Figure 2:
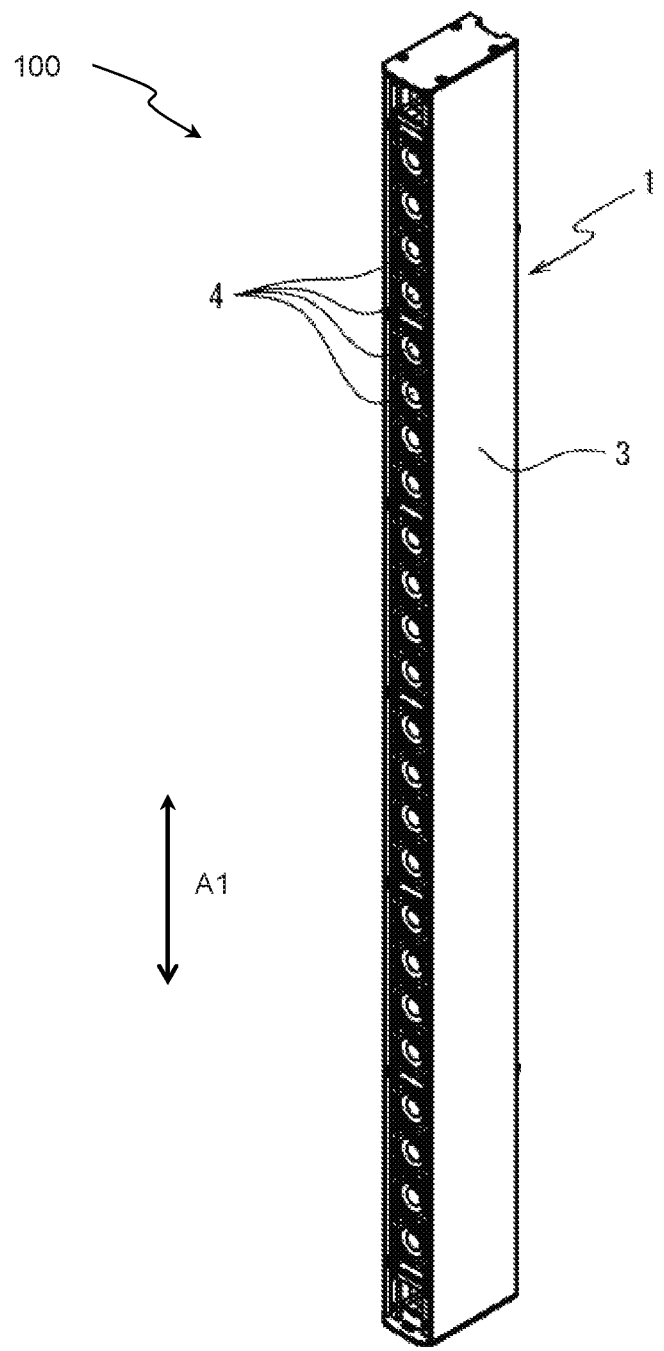
FIG. 2 is a perspective view illustrating a front side of the speaker device of FIG. 1.

FIGS. 1 and 2 show a speaker device according to one embodiment. The speaker device 100 comprises a speaker 1 and two mounting tools 2 disposed on a back surface 3a of this speaker 1.

In the speaker device 100, two female members 5 or two male members 6 (see FIGS. 3-6) of the two mounting tools 2 are fixed to the back surface 3a of the speaker 1, and the two mounting tools 2 are aligned in an aligning direction A1 with a space therebetween. In the embodiment, the two male members 6 of the two mounting tools 2 (mounting tool 2a and additional mounting tool 2b) are fixed to the back surface 3a of the speaker 1 and aligned vertically with the space. For example, the two male members 6 can be fixed to the back surface 3a of the speaker 1 by using screws.

Speaker

The speaker 1 is a column speaker in which identical speaker units 4 are arranged in a row inside an elongated housing 3.

Since the directivity angle in a direction in which the speaker units 4 are arranged is small (the spread of sound is small), this speaker 1 can suppress reflection on the floor and ceiling to reduce reverberation, by arranging the speaker units 4 in the vertical direction in a relatively large room. In order to effectively use space, this type of speaker 1 is assumed to be mounted on an inner wall surface of a room at a height that is out of reach of people.

Mounting Tool

Each of the mounting tools 2 (mounting tool 2a and additional mounting tool 2b) is disposed so as to mount the speaker 1 to a wall, a pillar, or the like. In the embodiment, the mounting tool 2a and the additional mounting tool 2b are identical. Accordingly, the mounting tool 2a and the additional mounting tool 2b will be explained below as the mounting tool 2. This mounting tool 2 is itself another embodiment.

Figure 3:
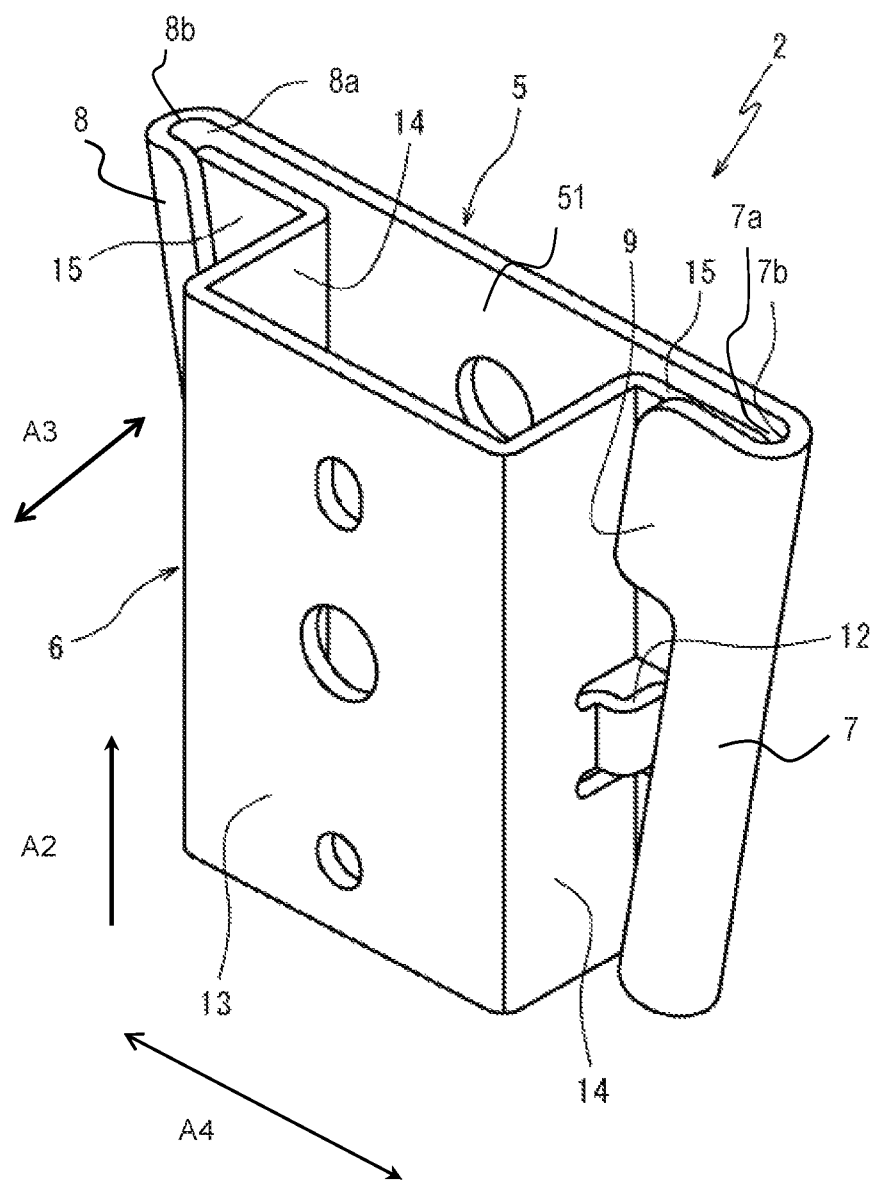
FIG. 3 is a perspective view illustrating a mounting tool of the speaker device of FIG. 1.
Figure 4:
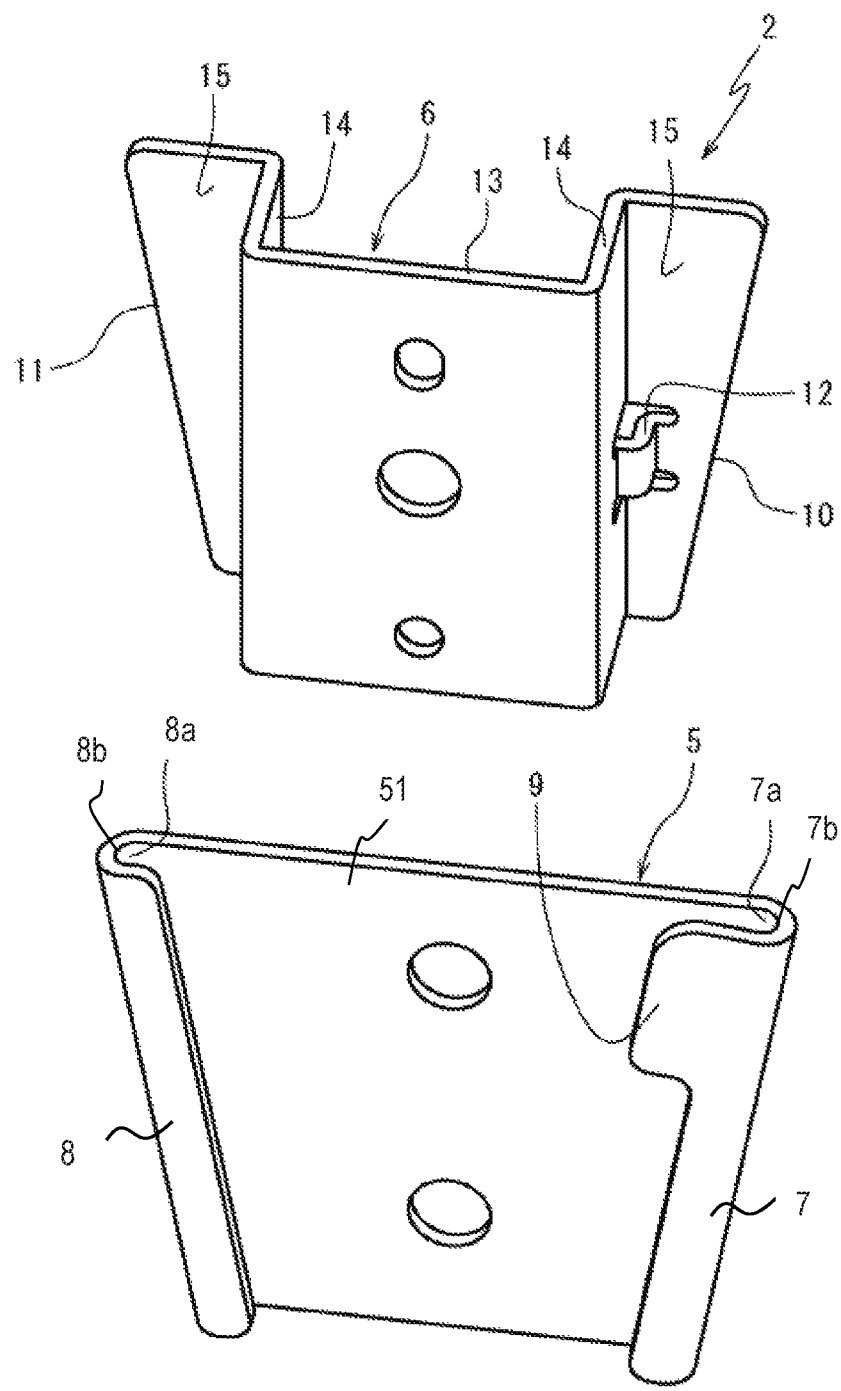
FIG. 4 is an exploded perspective view of the mounting tool of FIG. 3.
Figure 5:
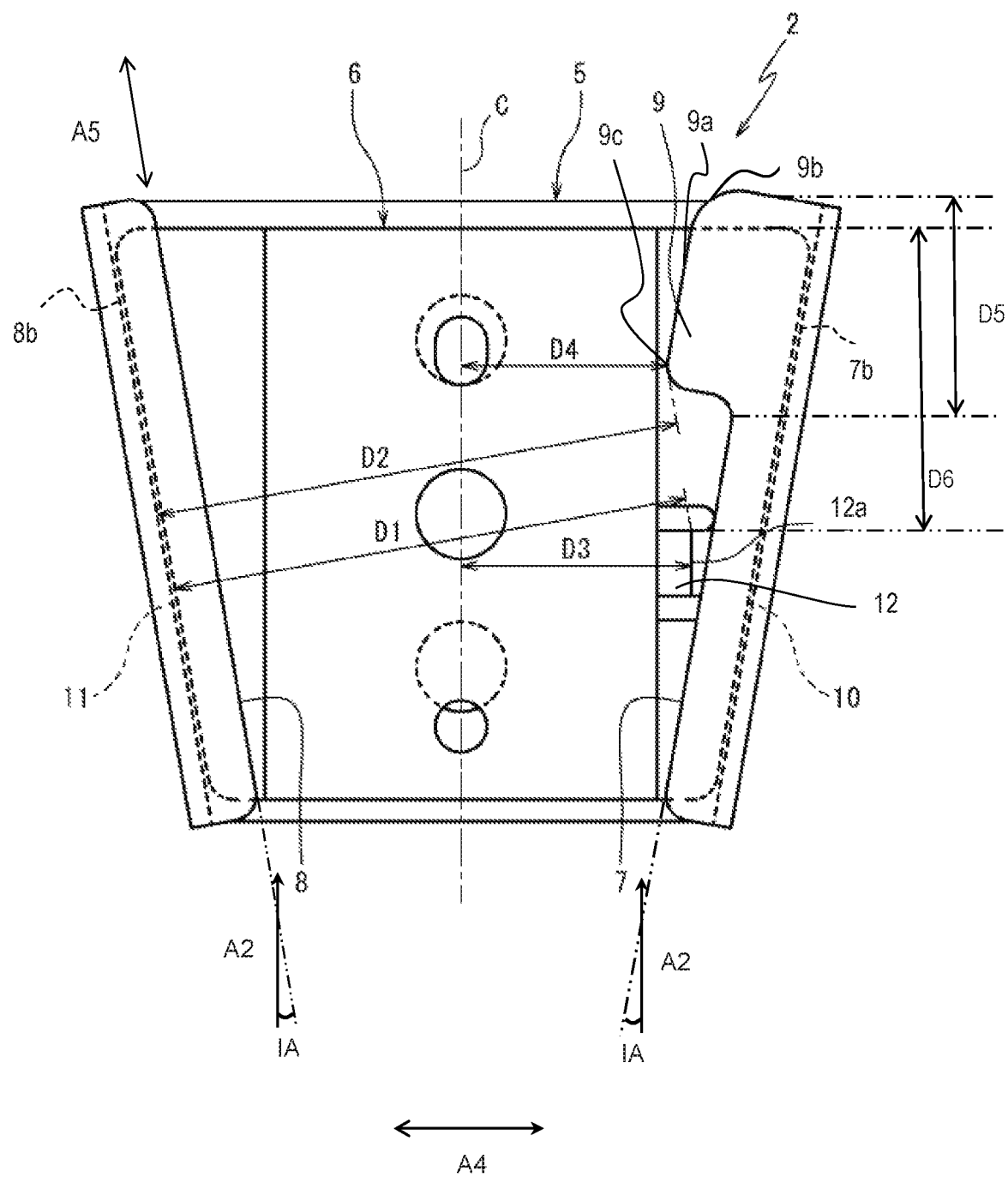
FIG. 5 is a front view of the mounting tool of FIG. 3.

As shown in FIGS. 3 to 5, the mounting tool 2 includes the female member 5, and the male member 6 that is fitted to this female member 5 so as to be detachable in a detachable direction. In FIGS. 3 to 5, the detachable direction is the vertical direction as viewed in FIGS. 3 to 5.

In the mounting tool 2 according to the embodiment, the male member 6 is fixed to the back surface 3a of the speaker 1 as shown in FIG. 1, and when the speaker 1 is mounted to a wall, or the like, the female member 5 is fixed to the wall, or the like.

The female member 5 has a first engagement groove 7 and a second engagement groove 8 that open inward in a cross-sectional view (horizontal sectional view) of the female member 5 (in other words, as viewed in the vertical direction (intermediate axis direction A2)) such that an inner portion 7a of the first engagement groove 7 and an inner portion 8a of the second engagement groove 8 can face each other. The first engagement groove 7 and the second engagement groove 8 are disposed such that a distance therebetween increases toward one side of the female member 5. In the embodiment, the distance between the first engagement groove 7 and the second engagement groove 8 increases toward an upper side as the one side of the female member 5 as the first engagement groove 7 and the second engagement groove 8 move in the intermediate axis direction A2. The female member 5 further has a female-side locking projection 9 that is disposed adjacent to the first engagement groove 7 and protrudes from the first engagement groove 7 toward a side of the second engagement groove 8. The female member 5 also has a main body 51 disposed between the first engagement groove 7 and the second engagement groove 8. The intermediate axis direction A2 extends along a common intermediate axis (intermediate axis) C between the first engagement groove 7 and the second engagement groove 8. In the embodiment, the intermediate axis direction A2 is the vertical direction in FIGS. 3 and 5.

The male member 6 has a first rail portion 10 and a second rail portion 11 that are simultaneously fittable into the first engagement groove 7 and the second engagement groove 8. More specifically, the first rail portion 10 and the second rail portion 11 are disposed with a distance therebetween and inclination relative to the intermediate axis direction A2 that are complementary to the distance between the first engagement groove 7 and the second engagement groove 8 and inclination of the first engagement groove 7 and the second engagement groove 8 relative to the intermediate axis direction A2, so as to be simultaneously finable into the first engagement groove 7 and the second engagement groove 8. In other words, the first and second rail portions 10 and 11 are spaced apart and inclined to mate with the first and second engagement grooves 7 and 8. The male member 6 further has a male-side locking projection 12 that is disposed adjacent to the first rail portion 10 and prevents the male member 6 from being unintentionally detached from the female member 5 by abutting against the female-side locking projection 9 of the female member 5. The male-side locking projection 12 is disposed so as to interfere with the female-side engagement protrusion 9 while the first rail portion 10 and the second rail portion 11 that are being fitted into the first engagement groove 7 and the second engagement groove 8 move in the intermediate axis direction A2 between the first engagement groove and the second engagement groove, and so as not to interfere with the female-side locking projection 9 while the second rail portion 11 is being slid along the second engagement groove 8.

In the mounting tool 2, since the first engagement groove 7 and the second engagement groove 8 are inclined such that the distance therebetween increases toward the upper side, the male member 6 engages with and is firmly held by the female member 5 due to gravity, by the first rail portion 10 and the second rail portion 11 being fitted into the first engagement groove 7 and the second engagement groove 8.

The female member 5 and the male member 6 can each be formed by bending one sheet of metal plate.

Examples of the metal plate that forms each of the female member 5 and the male member 6 include plated steel plates, stainless steel plates, and the like. The average thickness of the metal plate that forms each of the female member 5 and the male member 6 can be any thickness that provides sufficient rigidity, such as 0.5 mm to 3.5 mm.

Specifically, in the female member 5, the first engagement groove 7 and the second engagement groove 8 are defined by edge portions of a pair of legs of a metal plate having a trapezoidal shape, in which the upper base is longer than the lower base and the angles of the pair of legs are equal, being bent so as to be folded back. Accordingly, the first engagement groove 7 and the second engagement groove 8 of the female member 5 are arranged so as to be bilaterally-symmetrical with respect to the common intermediate axis C and are formed so as to extend linearly. The folding angle of the metal plate that defines the first engagement groove 7 and the second engagement groove 8 is preferably less than 180°, for example 150° to 179°, such that the male-side locking projection 12 can abut the female-side locking projection 9 even if a protruding length of the male-side locking projection 12 in a perpendicular direction A3 is reduced. The perpendicular direction A3 is perpendicular to the intermediate axis direction A2 as illustrated in FIG. 3.

Figure 6:
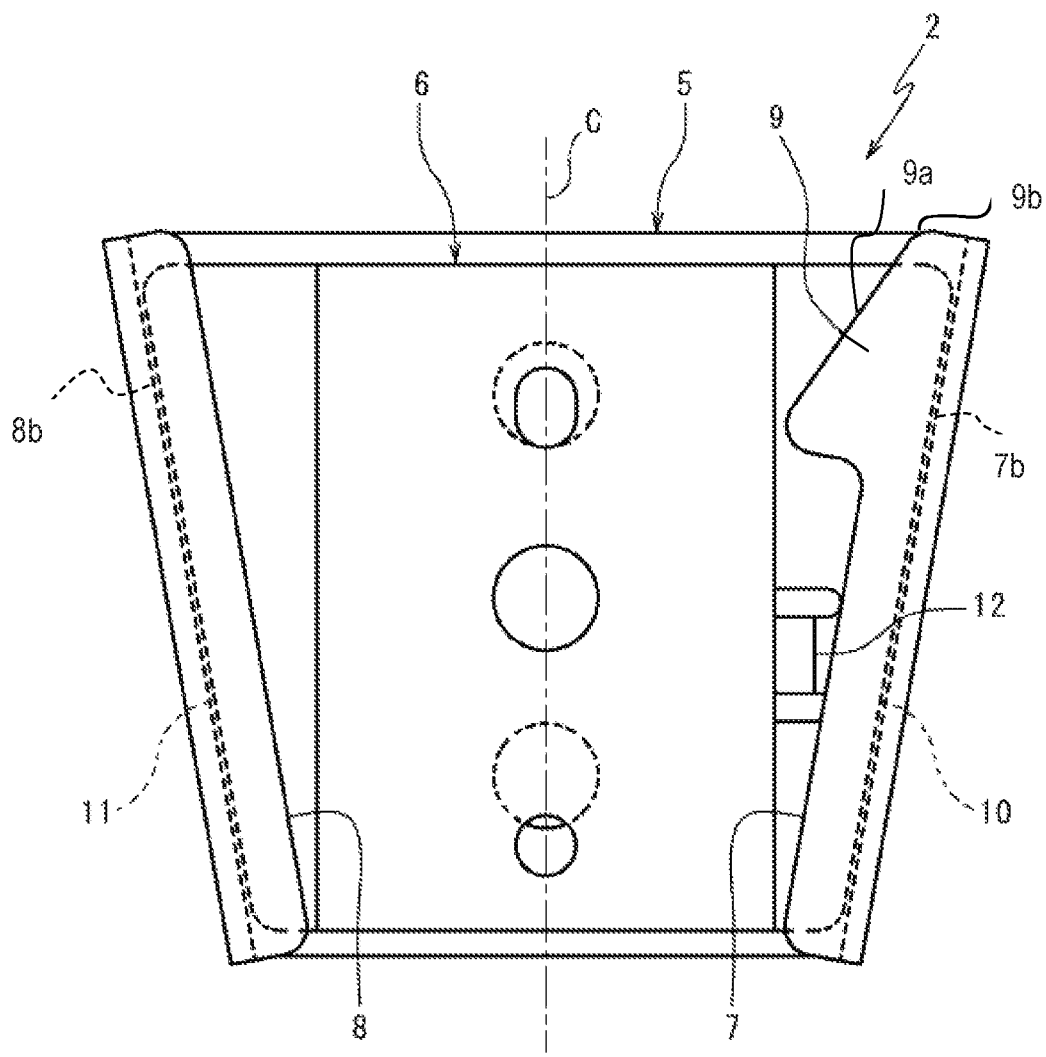
FIG. 6 is a front view of a modified example of the mounting tool of FIG. 5.

Additionally, the female-side locking projection 9 is formed in the female member 5 by projecting an upper end portion of the folded portion defining the first engagement groove 7 toward the second engagement groove 8 side. In order to facilitate the fitting of the male member 6 to the female member 5, a distal end edge 9a of the female-side locking projection 9 is preferably formed, for example, parallel to the first engagement groove 7 as shown in FIG. 5. Alternatively, the distal end edge 9a of the female-side locking projection 9 is preferably more inclined with respect to the common intermediate axis C than the first engagement groove 7, as shown in FIG. 6, such that the distance from the common intermediate axis C increases toward the upper side of the female member 5 as the distance between the first engagement groove 7 and the second engagement groove 8 increases. In addition, the distal end edge 9a of the female-side locking projection 9 is not limited to the linear inclined surface as shown in FIGS. 5 and 6, and can be a curved inclined surface. Additionally, the distal end edge 9a of the female-side locking projection 9 has an upper end portion corner (end portion corner) 9b which is chamfered and is disposed on the upper side of the female member 5. The fitting of the male member 6 to the female member 5 can also be made easy by chamfering the upper end portion corner 9b.

The lower limit of an inclination angle IA of each of the first engagement groove 7 and the second engagement groove 8 with respect to the intermediate axis direction A2, in other words, with respect to the common intermediate axis C is preferably 5°, and more preferably 8°. On the other hand, the upper limit of the inclination angle IA of each of the first engagement groove 7 and the second engagement groove 8 with respect to the common intermediate axis C is preferably 20°, and more preferably 15°. If the inclination angle IA less than the lower limit, there is a risk that it becomes difficult to secure space for disposing the female-side locking projection 9, or a risk that the effect of preventing unintended separation of the female member 5 and the male member 6 becomes insufficient. Conversely, if the inclination angle IA exceeds the upper limit, there is a risk that the attaching/detaching direction between the female member 5 and the male member 6 becomes inclined, reducing the handling property.

The first engagement groove 7 includes the inner portion 7a that has a curved cross-sectional shape, and the second engagement groove 8 includes an inner portion 8a that has a curved cross-sectional shape. Each of the inner portion 7a and the inner portion 8a has a cross-sectional shape that is preferably semicircular, as shown in FIGS. 3 and 4. Alternatively, each of the inner portions 7a and 8a has a cross-sectional shape that is preferably semielliptical. Since the bending of the metal plate thereby becomes relatively easy and the widths in the perpendicular direction A3 of the first engagement groove 7 and the second engagement groove 8 can be made small, it becomes possible to use the edges of the metal plate having the same thickness as the female member 5 as the first rail portion 10 and the second rail portion 11 of the male member 6, and thus the configuration of the male member 6 can be simplified.

In addition, since the cross section shape of each of the inner portions 7a and 8a is semicircular or semielliptical, it is possible to position the first rail portion 10 and the second rail portion 11 in the center in the perpendicular direction A3 of the first engagement groove 7 and the second engagement groove 8, and to cause the male member 6 to engage with the female member 5 without rattling, by causing the male member 6 and the female member 5 to firmly engage with each other.

The average width of the first engagement groove 7 and the second engagement groove 8 in the perpendicular direction A3 (diameter of the folded portion in the perpendicular direction A3) can be, for example, 1.5 to 2.5 times the average thickness of the metal plate. If the average width of the first engagement groove 7 and the second engagement groove 8 in the perpendicular direction A3 is less than the lower limit, there is a risk that the bending process becomes difficult. Conversely, if the average width of the first engagement groove 7 and the second engagement groove 8 in the perpendicular direction A3 exceeds the upper limit, there is a risk that the male member 6 may rattle.

The length in the intermediate axis direction A2 of the first engagement groove 7 and the second engagement groove 8 (which is usually equal to or substantially equal to the length in the intermediate axis direction A2 of the female member 5) can be, for example, 1 cm to 30 cm. If the length in the intermediate axis direction A2 of the first engagement groove 7 and the second engagement groove 8 is less than the lower limit, there is a risk that an unintended separation between the female member 5 and the male member 6 cannot be reliably prevented, due to lessening the distance between the mounted state in which the male member 6 is fitted into the female member 5 and a state in which the male-side locking projection 12 detaches in the upward direction from the female-side locking projection 9, thereby making it possible for the male member 6 to detach from the female member 5, Conversely, if the length in the intermediate axis direction A2 of the first engagement groove 7 and the second engagement groove 8 exceeds the upper limit, there is a risk that the male member 6 can no longer be easily attached to the female member 5, due to the increase in the relative movement distance in a lateral direction A4 when fitting the male member 6 into the female member 5. The lateral direction A4 is perpendicular to the intermediate axis direction A2 and the perpendicular direction A3.

The average distance between the first engagement groove 7 and the second engagement groove 8 (distance between an innermost portion 7b of the inner portion 7a of the first engagement groove 7, and an innermost portion 8b of the inner portion 8a of the second engagement groove 8 at the center in the intermediate axis direction A2 (vertical direction)) can be, for example, 1 cm to 30 cm. If the average distance between the first engagement groove 7 and the second engagement groove 8 is less than the lower limit, there is a risk that it will become difficult to provide a configuration for fixing the female member 5 and the male member 6 to the wall, etc., and to the speaker 1. Conversely, if the average distance between the first engagement groove 7 and the second engagement groove 8 exceeds the upper limit, there is a risk that the mounting tool 2 will become unnecessarily large.

The female member 5 can have a structure for fixing to a wall, etc., provided on the main body 51 between the first engagement groove 7 and the second engagement groove 8, such as a hole that can be fixed by means of a screw, or the like.

The male member 6 further has a rectangular plate-like fixing portion 13 to be fixed to the back surface 3a of the speaker 1, a pair of connecting portions 14 that extend rearward (in the perpendicular direction A3) from both left and right edges of the fixing portion 13, and engagement portions 15 that are trapezoidal or triangular and respectively extend outward from the distal ends of the connection portions 14 in the lateral direction A4 (left-right direction).

The first rail portion 10 and the second rail portion 11 are configured from the distal end edges of the engagement portions 15 in the lateral direction A4 (left-right direction).

In the male member 6, a structure for fixing to a wall, etc. can be provided on the fixing portion 13, such as a hole that can be fixed by means of a screw, or the like.

The length in the intermediate axis direction A2 of the first rail portion 10 and the second rail portion 11 (which is usually equal to or substantially equal to the length in the intermediate axis direction A2 of the male member 6) is preferably substantially the same as the length in the intermediate axis direction A2 of the first engagement groove 7 and the second engagement groove 8, and more preferably less than or equal to the length in the intermediate axis direction A2 of the first engagement groove 7 and the second engagement groove 8. Specifically, the length in the intermediate axis direction A2 of the first rail portion 10 and the second rail portion 11 can be set to, for example, 85% to 100% of the length in the intermediate axis direction A2 of the first engagement groove 7 and the second engagement groove 8. If the length in the intermediate axis direction A2 of the first rail portion 10 and the second rail portion 11 is less than the lower limit, there is a risk that the effect of preventing unintended separation of the female member 5 and the male member 6 will be reduced. Conversely, if the length in the intermediate axis direction A2 of the first rail portion 10 and the second rail portion 11 exceeds the upper limit, there is a risk that the male member 6 will become unnecessarily large.

In addition, while not particularly limited, the male-side locking projection 12 can be formed by bending a band-like portion defined by a pair of slits formed straddling a boundary between the engagement portion 15 on the side on which the first rail portion 10 is formed and the connection portion 14 adjacent thereto, so as to protrude from the connection portion 14 outward in the lateral direction A4 (left-right direction), as in the embodiment.

In the mounting tool 2, a space is formed between the female member 5 (main body 51) and the fixing portion 13 of the male member 6 in a state in which the male member 6 is attached to the female member 5, as a result of the male member 6 having the pair of connecting portions 14. For this reason, interference between a member for fixing the female member 5 to the wall, etc., such as a screw, and a member for fixing the male member 6 to the speaker 1, is prevented.

The first rail portion 10 and the second rail portion 11 are formed inclined at the same angle with respect to the intermediate axis direction A2 as the first engagement groove 7 and the second engagement groove 8, and respectively extend in a linear manner.

The male-side locking projection 12 is disposed such that the male-side locking projection 12 partially overlaps with the female-side locking projection 9 as viewed in the intermediate axis direction A2 (in other words, the direction of the common intermediate axis C between the first engagement groove 7 and the second engagement move 8), in a state in which the first rail portion 10 and the second rail portion 11 are fitted into the first engagement groove 7 and the second engagement groove 8, and such that the male-side locking projection 12 does not overlap with the female-side locking projection 9 as viewed. from a direction A5 along the second engagement groove 8, in the state in which the first rail portion 10 and the second rail portion 11 are fitted into the first engagement groove 7 and the second engagement groove 8.

In other words, in the state in which the first rail portion 10 and the second rail portion 11 are fitted into the first engagement groove 7 and the second engagement groove 8, as shown in FIG. 5, a distance D1 from a distal end 12a of the male-side locking projection 12 to the second rail portion 11 of the male member 6 (abutting surface to the second engagement groove 8) is smaller than a distance D2 from the distal end 9c of the female-side locking projection 9 to the innermost portion 8b of the second engagement groove 8 of the female member 5, and a distance D3 from the distal end 12a of the male-side locking projection 12 to the common intermediate axis C is greater than a distance D4 from the distal end 9c of the female-side locking projection 9 to the common intermediate axis C. The effect of preventing an unintended detachment of the male member 6 from the female member 5 increases as the difference between the distance D1 and the distance D2 decreases, and as the difference between the distance D3 and the distance D4 increases.

The difference between the distance D1 and the distance D2 can be, for example, 0 mm to 1 mm. When this difference in distance is less than the lower limit, it becomes impossible to fit the male member 6 into the female member 5. Conversely, if this difference in distance exceeds the upper limit, there is a risk that an unintended separation of the female member 5 and the male member 6 cannot be reliably prevented.

In addition, the difference between the distance D3 and the distance D4 can be, for example, set to $\frac{1}{15}$ to $\frac{1}{5}$ of the length of the first engagement groove 7 in the lateral direction A4 perpendicular to the common intermediate axis C. If this difference in distance is less than the lower limit, there is a risk that an unintended separation of the female member 5 and the male member 6 will not be reliably preventable. Conversely, if this difference in distance exceeds the upper limit, there is a risk that it will become impossible to fit the male member 6 into the female member 5 or that the mounting tool 2 becomes unnecessarily large.

The lower limit of a distance DS in the intermediate axis direction A2 from the upper end of the first engagement groove 7 to the lower end of the female-side locking projection 9 is preferably 15%, and more preferably 20%, of the length in the intermediate axis direction A2 of the first engagement groove 7. On the other hand, the upper limit of the distance D5 from the upper end of the first engagement groove 7 to the lower end of the female-side locking projection 9 is preferably 40%, and more preferably 30%, of the length in the intermediate axis direction A2 of the first engagement groove 7. If the distance D5 is less than the lower limit, there is a risk that it will become difficult to ensure the strength of the female-side locking projection 9, or that the fitting of the male member 6 to the female member 5 will become difficult. Conversely, if the distance D5 exceeds the upper limit, there is a risk that detachment of the male member 6 from the female member 5 will not be sufficiently preventable due to the smaller overlap between the female-side locking projection 9 and the male-side locking projection 12, when viewed in the intermediate axis direction A2 (the common intermediate axis C direction).

The lower limit of a distance D6 in the intermediate axis direction A2 from the upper end of the first rail portion 10 to the upper end of the male-side locking projection 12 is preferably 35%, and more preferably 40%, of the length in the intermediate axis direction A2 of the first rail portion 10. On the other hand, the upper limit of the distance D6 in the intermediate axis direction A2 from the upper end of the first rail portion 10 to the upper end of the male-side locking projection 12 is preferably 60%, and more preferably 55%, of the length in the intermediate axis direction A2 of the first rail portion 10. If the distance D6 is less than the lower limit, there is a risk that detachment of the male member 6 from the female member 5 will not be sufficiently preventable due to the smaller overlap between the female-side locking projection 9 and the male-side locking projection 12, when viewed in the intermediate axis direction A2 common (the intermediate axis C direction). Conversely, if the distance D6 exceeds the upper limit, there is a risk that the width of the mounting tool 2 in the lateral direction A4 (left-right direction) will become unnecessarily large in order to increase the overlap between the female-side locking projection 9 and the male-side locking projection 12, when viewed in the intermediate axis direction A2 (the common intermediate axis C direction).

The length in the intermediate axis direction A2 of the male-side locking projection 12 is preferably set as small as possible within a range in which sufficient rigidity can be obtained. Specifically, the length in the intermediate axis direction A2 of the male-side locking projection 12 can be, for example, 3 mm to 5 mm. If the length in the intermediate axis direction A2 of the male-side locking projection 12 is less than the lower limit, there is a risk that the male-side locking projection 12 will be damaged and that the detachment of the male member 6 from the female member 5 will not be sufficiently preventable. Conversely, if the length in the intermediate axis direction A2 of the male-side locking projection 12 exceeds the upper limit, there is a risk that the overlap with the female-side locking projection 9, when viewed in the intermediate axis direction A2 (the common intermediate axis C direction), will not he made sufficiently large to prevent interference with the first engagement groove 7.

Advantages

The mounting tool of the disclosure is able to easily mount a device to a wall, or the like, so that the device does not unintentionally fall due to vibration.

With the speaker device 100, the speaker 1 is firmly mounted to the wall, or the like, as the mounting tool 2 causes the first rail portion 10 and the second rail portion 11 to engage the first engagement groove 7 and the second engagement groove 8; therefore vibration of the housing 3 of the speaker 1 can be suppressed, thereby improving sound reproducibility.

In the mounting tool 2, the male member 6 can be easily attached to and detached from the female member 5 by sliding and moving the second rail portion 11 along the second engagement groove 8, but when moved relatively in a direction different from this sliding direction, the male-side locking projection 12 interferes with the female-side locking projection 9, thereby preventing detachment of the male member 6 from the female member 5.

Here, if a person detaches the male member 6 from the female member 5, the operation of sliding the second rail portion 11 along the second engagement groove 8 can he easily achieved. However, in the case of an external force such as a collision of an object with the speaker 1 or an earthquake, a phenomenon in which the male member 6 accurately moves in a direction in which the second rail portion 11 slides along the second engagement groove 8 can hardly occur. Therefore, by using the mounting tool 2, the speaker 1 can be easily attached and removed from a wall, or the like, while also preventing unintended falling of the speaker 1 due to impact from another object, vibration, or the like.

Other Embodiments

The above-described embodiment does not limit the configuration of this disclosure. Therefore, in the above-described embodiment, the compositional elements of each part of the embodiment may he omitted, replaced, or added based on the recitation of the present Specification and common knowledge in the art, all of which shall he interpreted as belonging to the scope of the this disclosure.

Figure 7:
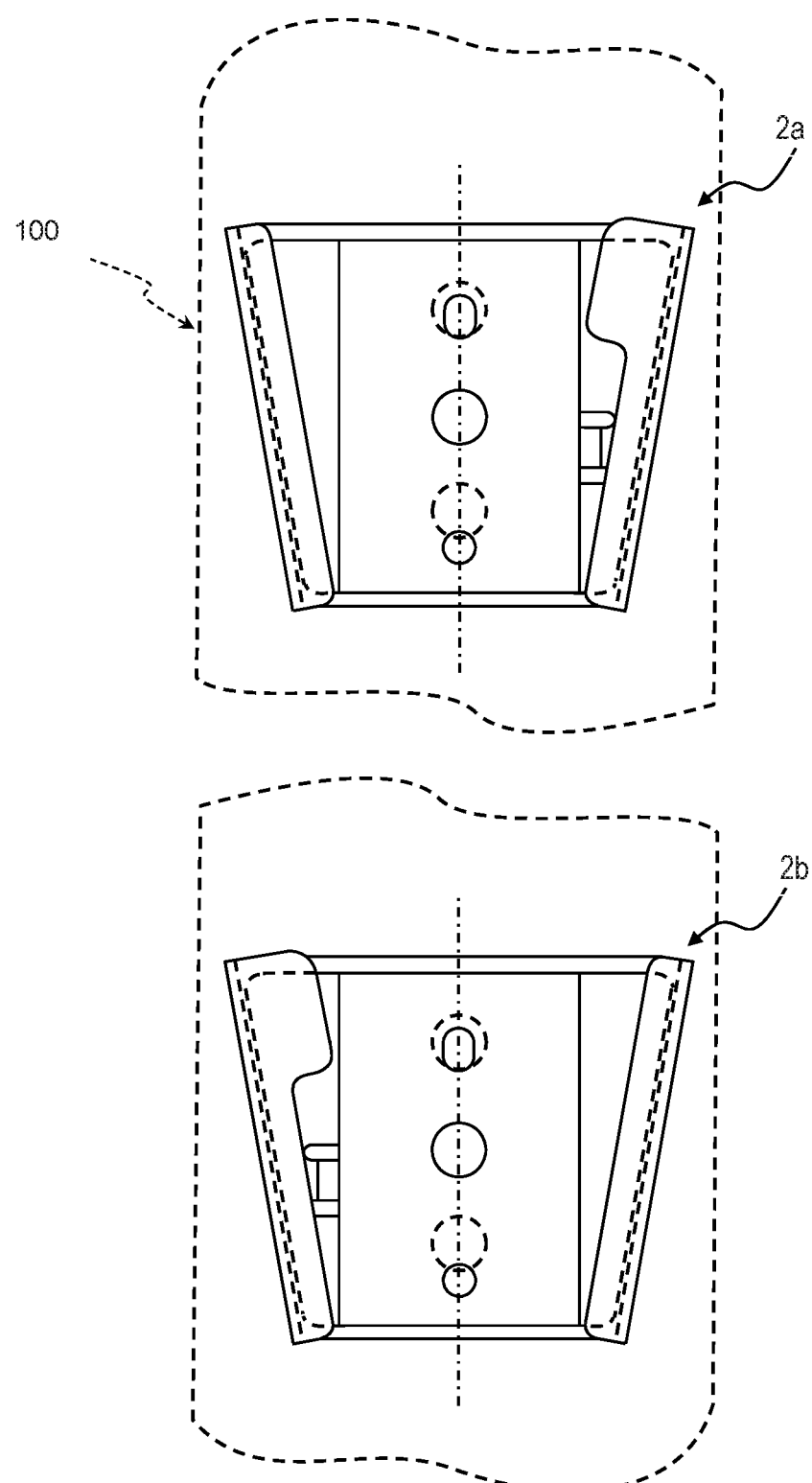
FIG. 7 is a view illustrating two mounting tools of a speaker device according to another embodiment.

As shown in FIG. 7, in the speaker device 100 of another embodiment, the arrangement of the first engagement groove 7 and the second engagement groove 8 with respect to the common intermediate axis C can be reversed between the two mounting tools 2a and 2b. That is, the two mounting tools 2a and 2b can have a shape in which the shapes of the female member 5 and the male member 6 are reversed in the left-right direction with respect to the common intermediate axis C. For example, one of the mounting tool 2a and the additional mounting tool 2b includes the female member 5 and the male member 6 as explained in the above-discussed embodiment. On the other hand, the other of the mounting tool 2a and the additional mounting tool 2b includes a female member that has a shape and an arrangement reversed in the lateral direction A4 (left-right direction comparison with those of the female member 5 as illustrated in FIG. 5, and a male member that has a shape and an arrangement reversed in the lateral direction A4 (left-right direction) in comparison with those of the male member 6 as illustrated in FIG. 5. As a result of the arrangement of the first engagement groove 7 and the second engagement groove 8 being reversed between the two mounting tools 2, the speaker cannot be removed without tilting and lifting the speaker 1 upward, thus making it possible to more reliably prevent an unintended fall of the speaker 1.

The mounting tool 2 can be used to mount a device other than the speaker 1 to a wall, or the like.

The mounting tool 2 is not limited to being formed by bending a metal plate, and can be, for example, a metal machined body, a forged body, a resin-molded body, or the like.

The female-side locking projection 9 and the male-side locking projection 12 in the mounting tool 2 can have a different structure than that of the embodiment described above, as long as the above-mentioned positional relationship is satisfied, such as a structure in which another member is attached to the female member 5 and the male member 6.

In the mounting tool 2, the male member 6 can be attached to the wall, or the like, and the female member 5 can be fixed to a device such as a speaker 1. In this case, the mounting tool 2 is arranged such that the distance between the first engagement groove 7 and the second engagement groove 8 increases downward (toward a lower side as the one side of the female member 5) in an opposite direction opposite to the intermediate axis direction A2.

The speaker 1 of the speaker device 100 is not limited to the column speaker, and can be other types of speaker.

The number of the mounting tools 2 provided to the speaker device can be one, or three or more.

In the speaker device 100, the arrangement of the first engagement groove 7 and the second engagement groove 8 of all the mounting tools 2 can be the same.

The mounting tool 2 can be used to attach any article to a wall, or the like, but is particularly suitable for mounting a speaker 1.

Preferred Aspects

Preferred aspects that can be ascertained from the specific embodiments exemplified above are illustrated below.

A mounting tool according to one aspect of this disclosure, which solves the problem described above, comprises a female member having a first engagement groove and a second engagement groove that are inclined so as to open inward in a cross-sectional view and such that the distance therebetween increases toward one side, as well as a female-side locking projection that is disposed adjacent to the first engagement groove and protrudes to the second engagement groove side, and a male member having a first rail portion and a second rail portion that can be simultaneously fitted into the first engagement groove and the second engagement groove, as well as a male-side locking projection that is disposed adjacent to the first rail portion and so as to interfere with the female-side engagement protrusion when the first rail portion and the second rail portion move from a state of being fitted into the first engagement groove and the second engagement groove to an intermediate axis direction between the first engagement groove and the second engagement groove, and so as to not interfere with the female-side locking projection when the second rail portion is slid along the second engagement groove.

Since the mounting tool has the female member having the first engagement groove and the second engagement groove that are inclined such that the distance therebetween increases toward one side, and the male member having the first rail portion and the second rail portion that are disposed with a distance and inclination that are complementary to those of the first engagement groove and the second engagement groove, it is possible to fix the male member to the female member by fitting the first rail portion and the second rail portion into the first engagement groove and the second engagement groove. In addition, since the female member has the female-side locking projection and the male member has the male-side locking projection in the mounting tool, unless the male member and the female member are accurately moved relative to each other such that the second rail portion moves along the second engagement groove, the female-side locking projection and the male-side locking projection interfere with each other and prevent separation between the male member and the female member. Therefore, the mounting tool is able to easily mount a device such as a speaker to a wall, or the like, and to prevent the mounted device from unintentionally falling, because the male member and the female member will not be separated due to vibration, or the like.

In the mounting tool, the male member and the female member are preferably each formed by bending one sheet of metal plate.

In the mounting tool, the inclination angle of the first engagement groove and the second engagement groove with respect to the intermediate axis is preferably 5° to 20°.

In the mounting tool, the cross-sectional shape of the inner portions of the first engagement groove and the second engagement groove is preferably semicircular or semielliptical.

In the mounting tool, a corner of an end portion of a distal end edge of the female-side locking projection, on the side in which the distance between the first engagement groove and the second engagement groove is large, is preferably chamfered.

In the mounting tool, the distal end edge of the female-side locking projection is preferably inclined such that the distance from the intermediate axis increases as the distance between the first engagement groove and the second engagement groove increases.

In the mounting tool, the distance from the distal end of the male-side locking projection to the distal end edge of the second rail portion is preferably smaller than the distance from the distal end of the female-side locking projection to the inner portion of the second engagement groove, and the distance from the distal end of the male-side locking projection to the intermediate axis between the first rail portion and the second rail portion is preferably larger than the distance from the distal end of the female-side locking projection to the intermediate axis.

A mounting tool according to another aspect of this disclosure comprises a female member having a first engagement groove and a second engagement groove that are inclined so as to open inward in a cross-sectional view and such that the distance therebetween increases toward one side, as well as a female-side locking projection that is disposed adjacent to the first engagement groove and protrudes to the second engagement groove side, and a male member having a first rail portion and a second rail portion that are disposed so as to have a distance and inclination that are complementary to those of the first engagement groove and the second engagement groove, as well as a male-side locking projection that is disposed adjacent to the first rail portion, and, in a state in which the first rail portion and the second rail portion are fitted into the first engagement groove and the second engagement groove, at least a portion of which overlaps with the female-side locking projection when viewed from a direction of an intermediate axis between the first engagement groove and the second engagement groove, and that does not overlap with the female-side locking projection when viewed from a direction along the second engagement groove.

A speaker device according to another aspect of this disclosure comprises the mounting tool described above, and a speaker to the back surface of which is attached the female member or the female member of the mounting tool.

The speaker device preferably includes two of the mounting tools, the female members or the female members of the mounting tools are fixed to the back surface of the speaker aligned vertically with a space therebetween, and the arrangement of the first engagement groove and the second engagement groove with respect to the intermediate axis is reversed between the two mounting tools.

What is claimed is:

1. A mounting tool comprising:
a female member having a first engagement groove and a second engagement groove that are inclined such that a distance between the first engagement groove and the second engagement groove increases toward one side of the female member, the first engagement move and the second engagement groove opening inward as viewed in a cross-sectional view of the female member, the female member further having a female-side locking projection that is disposed adjacent to the first engagement groove and protrudes toward a side of the second engagement groove from the first engagement groove, and
a male member having a first rail portion and a second rail portion that are simultaneously finable into the first engagement groove and the second engagement groove, the male member further having a male-side locking projection that is disposed adjacent to the first rail portion and that is disposed so as to interfere with the female-side engagement protrusion while the first rail portion and the second rail portion that are being fitted into the first engagement groove and the second engagement groove move in an intermediate axis direction between the first engagement groove and the second engagement groove, and so as not to interfere with the female-side locking projection while the second rail portion is being slid along the second engagement groove.

2. The mounting tool according to claim 1, wherein the male member and the female member are each formed by bending one sheet of metal plate.

3. The mounting tool according to claim 1, wherein an inclination angle of each of the first engagement groove and the second engagement groove with respect to the intermediate axis direction is 5° to 20°.

4. The mounting tool according to claim 1, wherein each of the first engagement groove and the second engagement groove includes an inner portion that has a curved cross-sectional shape.

5. The mounting tool according to claim 1, wherein a distal end edge of the female-side locking projection has an end portion corner which is disposed on the one side of the female member and is chamfered.

6. The mounting tool according to claim 1, wherein a distal end edge of the female-side locking projection is inclined such that a distance from an intermediate axis to the distal end edge increases as the distance between the first engagement groove and the second engagement groove increases, and the intermediate axis extends in the intermediate axis direction.

7. The mounting tool according to claim 1, wherein a distance from a distal end of the male-side locking projection to the second rail portion is smaller than a distance from a distal end of the female-side locking projection to an innermost portion of the second engagement groove, and
a distance from the distal end of the male-side locking projection to an intermediate axis that extends in the intermediate axis direction between the first rail portion and the second rail portion is larger than a distance from the distal end of the female-side locking projection to the intermediate axis.

8. A mounting tool comprising:
a female member having a first engagement groove and a second engagement groove that are inclined such that a distance between the first engagement groove and the second engagement groove increases toward one side of the female member, the female member further having a female-side locking projection that is disposed adjacent to the first engagement groove and protrudes toward a side of the second engagement groove from the first engagement groove, and
a male member having a first rail portion and a second rail portion that are disposed such that a distance between the first and second rail portions and inclinations of the first and second rail portions are complementary to the distance between the first and second engagement grooves and inclinations of the first and second engagement grooves, the male member further having a male-side locking projection that is disposed adjacent to the first rail portion,
the male-side locking projection partially overlapping with the female-side locking projection as viewed in an intermediate axis direction between the first engagement groove and the second engagement groove, in a state in which the first rail portion and the second rail portion are fitted into the first engagement groove and the second engagement groove, while the male-side locking projection does not overlap with the female-side locking projection as viewed in a direction along the second engagement groove in the state in which the first rail portion and the second rail portion are fitted into the first engagement groove and the second engagement groove.

9. The mounting tool according to claim 8, wherein the male member and the female member are each formed by bending one sheet of metal plate.

10. The mounting tool according to claim 8, wherein
an inclination angle of each of the first engagement groove and the second engagement groove with respect to the intermediate axis direction is 5° to 20°.

11. The mounting tool according to claim 8, wherein
each of the first engagement groove and the second engagement groove includes an inner portion that has a curved cross-sectional shape.

12. The mounting tool according to claim 8, wherein
a distal end edge of the female-side locking projection has an end portion corner which is disposed on the one side of the female member and is chamfered.

13. The mounting tool according to claim 8, wherein
a distal end edge of the female-side locking projection is inclined such that a distance from an intermediate axis to the distal end edge increases as the distance between the first engagement groove and the second engagement groove increases, and the intermediate axis extends in the intermediate axis direction.

14. The mounting tool according to claim 8, wherein
a distance from a distal end of the male-side locking projection to the second rail portion is smaller than a distance from a distal end of the female-side locking projection to an innermost portion of the second engagement groove, and
a distance from the distal end of the male-side locking projection to an intermediate axis that extends in the intermediate axis direction between the first rail portion and the second rail portion is larger than a distance from the distal end of the female-side locking projection to the intermediate axis.

15. A speaker device comprising:
the mounting tool according to claim 1, and
a speaker having a back surface to which one of the female member and the male member of the mounting tool is attached.

16. The speaker device according to claim 15, further comprising
an additional mounting tool which includes an additional female member and an additional male member that are identical to the female member and the male member, respectively, wherein
one of the additional female member and the additional male member is fixed to the back surface of the speaker such that the mounting tool and the additional mounting tool are aligned in an aligning direction with a space therebetween.

17. The speaker device according to claim 15, further comprising
an additional mounting tool which includes an additional female member having an arrangement reversed to an arrangement of the female member with respect to an intermediate axis extending in the intermediate axis direction, and an additional male member having an arrangement reversed to an arrangement of the male member with respect to the intermediate axis, wherein
one of the additional female member and the additional male member is fixed to the back surface of the speaker such that the mounting tool and the additional mounting tool are aligned in an aligning direction with a space therebetween.

18. A speaker device comprising:
the mounting tool according to claim 8, and
a speaker having a back surface to which one of the female member and the male member of the mounting tool is attached.

19. The speaker device according to claim 18, further comprising
an additional mounting tool which includes an additional female member and an additional male member that are identical to the female member and the male member, respectively, wherein
one of the additional female member and the additional male member is fixed to the back surface of the speaker such that the mounting tool and the additional mounting tool are aligned in an aligning direction with a space therebetween.

20. The speaker device according to claim 18, further comprising
an additional mounting tool which includes an additional female member having an arrangement reversed to an arrangement of the female member with respect to an intermediate axis extending in the intermediate axis direction, and an additional male member having an arrangement reversed to an arrangement of the male member with respect to the intermediate axis, wherein
one of the additional female member and the additional male member is fixed to the back surface of the speaker such that the mounting tool and the additional mounting tool are aligned in an aligning direction with a space therebetween.

* * * * *